(12) United States Patent
Gill et al.

(10) Patent No.: US 6,178,486 B1
(45) Date of Patent: Jan. 23, 2001

(54) TIME ALLOCATION SHARED MEMORY ARBITRATION FOR DISK DRIVE CONTROLLER

(75) Inventors: Parminder Gill; Clifford M. Gold, both of Fremont; James A. Henson, Morgan Hill, all of CA (US)

(73) Assignee: Quantum Corporation, Milpitas, CA (US)

( * ) Notice: Under 35 U.S.C. 154(b), the term of this patent shall be extended for 0 days.

(21) Appl. No.: 09/026,472

(22) Filed: Feb. 19, 1998

(51) Int. Cl.[7] .................................................. G06F 12/00
(52) U.S. Cl. ........................ 711/151; 711/158; 711/168; 711/167; 711/166
(58) Field of Search ................................... 711/149, 158, 711/151, 167, 168, 170, 166, 154

(56) References Cited

U.S. PATENT DOCUMENTS

| | | | |
|---|---|---|---|
| 5,099,420 | * 3/1992 | Barlow et al. | 710/119 |
| 5,261,058 | * 11/1993 | Squires et al. | 710/1 |
| 5,280,591 | * 1/1994 | Garcia et al. | 710/111 |
| 5,465,343 | 11/1995 | Henson et al. | 395/439 |
| 5,533,205 | 7/1996 | Blackledge, Jr. et al. | 395/297 |
| 5,581,782 | 12/1996 | Sarangdhar | 395/800 |
| 5,604,865 | 2/1997 | Lentz et al. | 395/200.08 |
| 5,634,015 | * 5/1997 | Chang et al. | 710/129 |
| 5,850,632 | * 12/1998 | Robertson | 711/170 |
| 5,878,280 | * 3/1999 | Lucht | 710/52 |
| 6,061,504 | * 5/2000 | Tzelnic et al. | 395/200.49 |
| 6,076,139 | * 6/2000 | Welker et al. | 711/104 |

\* cited by examiner

Primary Examiner—John W. Cabeca
Assistant Examiner—Pierre-Michel Bataille
(74) Attorney, Agent, or Firm—Michael Zarrubian

(57) ABSTRACT

A method and apparatus for arbitrating requests for access to a single buffer memory embedded within a disk drive in which a disk data channel is assigned a highest priority for buffer access within a queue. An arbitration cycle progressively services access requests pending within the queue, beginning with providing buffer access to the disk data channel and following with accesses to other channels during an arbitration cycle completion interval in accordance with a round-robin circular priority arrangement providing orderly access to all channels contending for memory access. At the end of completion interval, buffer access returns to the disk data channel, and thereafter, the arbitration cycle is repeated.

13 Claims, 3 Drawing Sheets

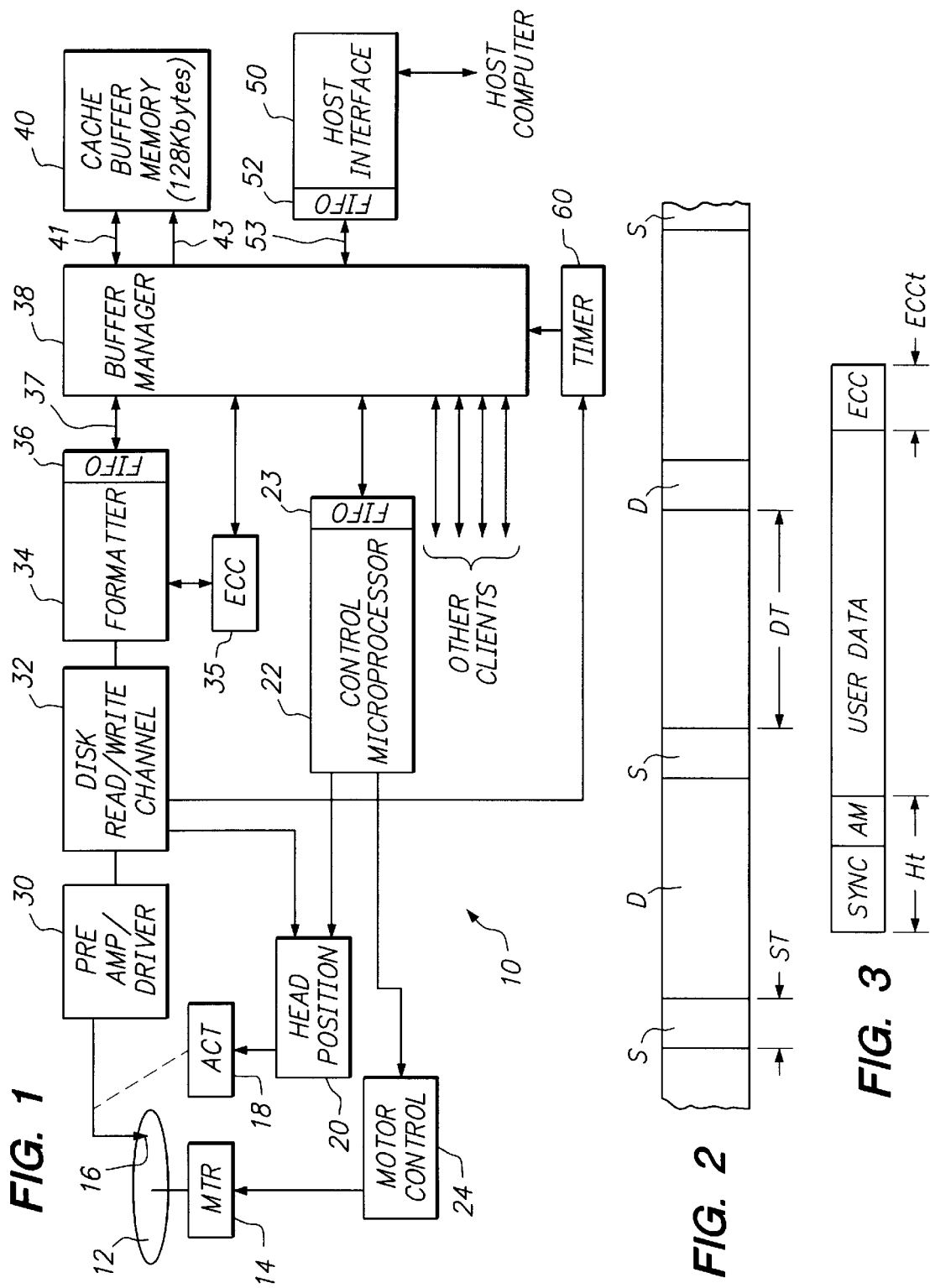

TIME ALLOCATION SHARED MEMORY ARBITRATION FOR DISK DRIVE CONTROLLER

FIELD OF THE INVENTION

The present invention relates to buffer memory access management within a disk drive data storage device. More particularly, the present invention relates to improved priority and round-robin access arbitration to provide predictable bandwidth allocations and latencies for all buffer memory clients of a multiplexed memory system within a disk drive's embedded controller environment.

BACKGROUND OF THE INVENTION

Previous recent disk drive designs have included, in addition to a disk data channel and a host data channel, at least one embedded digital microprocessor for controlling various functions of the disk drive such as head positioning, spindle motor speed regulation, read channel adjustments for zoned data recording and error correction tasks, and the supervision of data block transfers between disk and host in response to host commands received via the host channel. These prior designs have typically included a large data cache memory array for temporary storage of multiple data blocks in transit between the disk data storage surface and the host computing system, and smaller FIFO buffers associated with the disk data channel and the host data channel. More recently, shared use of on-board buffer memory has been extended to provide storage of instructions and data needed for microprocessor operations, with microprocessor accesses to buffer memory being multiplexed between disk channel and host channel block transfer memory accesses. These relatively large memory arrays have typically been comprised of dynamic random access memory chips (DRAM).

The DRAM memory in disk drive systems must be shared among several processes (herein referred to as "clients"). This sharing arrangement presents an interesting challenge to the designer. On the one hand, a DRAM operates most efficiently if the same client can present continuous access requests, as these requests will be sequential. A sequential request can most frequently be accomplished by accessing the DRAM in page mode. Depending upon DRAM type, page mode accesses are from three to nine times faster than non-page mode access requests. However, each client wants to obtain DRAM access as often as possible, which cuts down the length of time a particular access can be handled in page mode.

Previous disk drive designs have provided access to DRAM by the various disk drive process and resource clients via multiplexing and access arbitration. If only one client, such as the disk data channel, has a frequent, high-bandwidth "absolutely must have" need for buffer access, a simple priority scheme will suffice. The disk data channel will typically have this requirement, as the length of the disk FIFO is limited, and data will be lost if the disk channel FIFO is overrun. The other high-bandwidth channel, the host interface (SCSI or ATA), can be throttled when its FIFO is full. Thus, giving the disk channel highest priority when its FIFO is nearly full, and holding high until the disk FIFO is empty, works quite well. The host channel may have gaps. It has a lower priority, but when it obtains access to the DRAM, it holds onto its access until its FIFO is emptied or the disk channel overrides. The microprocessor, memory refresh, and other clients may be given a middle priority, for example.

One example of such a scheme is provided by commonly assigned U.S. Pat. No. 5,465,343 to Henson et al., entitled: "Shared Memory Array for Data Block and Control Program Storage in Disk Drive", the disclosure thereof being incorporated herein by reference. In this prior approach buffer memory access arbitration followed a hierarchical approach with each internal client seeking buffer access having a defined priority. For example, the disk data channel was given the highest priority, since data transfers to and from the disk must be made in synchronism with storage disk rotation in order not to incur delays caused by multiple disk rotation latencies during a data transfer. A next level priority was accorded to a dynamic memory array cell refresh function. A third level priority was accorded either to a host interface client or to a control microprocessor client, depending upon buffer manager programming and required memory bandwidths of the respective client processes. In implementations of the Henson et al. approach within disk drives, round-robin schemes have been used, so that if all channels are requesting DRAM access, each channel is serviced in a fixed order for a set maximum length of time. If any channel is not requesting access, the next channel in the priority sequence takes over, and so on. In any of these schemes at no time does the DRAM sit idle if there is an unserviced request for access from any channel. The problem with this prior scheme is that all numbers have to be set for the worst case, and maximum advantage is not taken on rounds where the worst-case does not occur.

Another drawback of the Henson et al. arbitration approach arose from the fact that the microprocessor's instruction and data access patterns to the shared memory array were unlike disk channel and host channel data block transfer access patterns. The disk channel and host channel clients have large sequential block accesses to the buffer memory via multi-word FIFOs and thus are suitable candidates for fast, page mode transfer requests. In contrast, the microprocessor typically fetches a single instruction from a segment (full buffer address) of the buffer and decodes the instruction in order to determine what further accesses it needs to the buffer memory. The instruction decode process may cause a delay in a subsequent buffer memory access request by the microprocessor. In the Henson et al. prior approach, the delay during instruction decode resulted in the microprocessor losing control of the buffer memory to another client, such as disk channel or host channel which did not critically require buffer memory access, but which had data available for transfer from FIFO to the buffer, or which had available FIFO space to receive data from the buffer. The loss of buffer memory access by the microprocessor in favor of data block transfers to disk channel FIFO or host channel FIFO not operating at full utilization produced a loss of efficiency in the buffer management process, and thus lowered the buffer memory resource available to the microcontroller. In many disk drive data transfer systems, the disk channel and the host channel will have their data block transfer requirements satisfied, but the embedded microprocessor controller will not.

It is known within general digital data computer designs to provide blended priority and round-robin bus arbitration schemes. One example is provided by U.S. Pat. No. 5,581,782 to Sarangdhar et al, entitled: "Computer System with Distributed Bus Arbitration Scheme for Symmetric and Priority Agents". This prior bus arbitration protocol supported both symmetric (round-robin) clients and priority clients. The symmetric clients were prioritized in a circular order of priority to equalize access to memory via the bus on a rotating basis. A priority client could claim ownership of the bus and override new access requests by a symmetric client, unless the request was part of an ongoing bus-locked operation. Another round-robin arbitration protocol was provided in U.S. Pat. No. 5,533,205 to Blackledge, Jr., et al., entitled: Method and System for Efficient Bus Allocation in a Multimedia Computer System". In this prior approach individual input/output devices were given bus access arbitration priority in a round-robin sequence so that each device obtained bus access at a minimum required data transfer rate needed to maintain proper multimedia presentation quality. While these prior approaches may have worked well within multiprocessor and multimedia computing environments respectively, they were not adapted to the unique problems and challenges of buffer management which have been discovered to be present within a hard disk drive.

The present invention provides a solution to the hitherto unsolved problems associated with arbitrating accesses to a shared memory array within a disk drive.

SUMMARY OF THE INVENTION WITH OBJECTS

A general object of the present invention is to provide more efficient and effective arbitration among competing processes seeking access to a shared memory array within the electronics of a hard disk drive in a manner overcoming limitations and drawbacks of the prior art.

Another object of the present invention is to impose a systematic circular priority queuing structure upon a plurality of channels contending for access to a single buffer memory array within a disk drive in a manner recognizing criticality of timing of the disk data channel and providing fair round-robin access to all other channels, particularly including host interface and microprocessor channels, for example.

In accordance with principles of the present invention, a method is provided for arbitrating requests for access to a single buffer memory embedded within a disk drive. The requests for access are presented by a disk data channel, a host interface data channel, a microprocessor channel and a plurality of other miscellaneous data channels. The method comprises the steps of:

arranging the disk data channel, the host interface data channel, the microprocessor channel and the plurality of other miscellaneous data channels into a round-robin circular priority queue, assigning the disk data channel a highest priority for buffer access within the queue, conducting an arbitration cycle by progressively servicing access requests pending within the queue, beginning with providing buffer access to the disk data channel, establishing an arbitration cycle completion interval beginning upon completion of disk data channel buffer memory access, progressively providing access to the host interface data channel, the microprocessor channel and at least one of the plurality of other miscellaneous data channels during the arbitration completion interval, returning access to the disk data channel prior to expiration of the arbitration cycle completion interval if the disk data channel is then requesting buffer memory access, and repeating the foregoing steps in a subsequent arbitration cycle wherein another one of the plurality of other miscellaneous data channels is provided buffer memory access in accordance with the round-robin circular priority queue.

In this aspect of the present invention the step of establishing the arbitration cycle completion interval may further include a step of determining a data fill level of a FIFO within the disk data channel. Further, the plurality of other miscellaneous data channels may include an error correction code channel, a buffer list manager channel, a disk defect management channel, and a dynamic memory refresh channel.

In this aspect of the invention a further step may be carried out of determining a host critical time interval based upon determination of a data fill level of a FIFO within the host interface channel. In connection with this step at least one of the plurality of other miscellaneous data channels is provided access to the buffer memory following determination that the host critical time interval provides extra buffer memory access time within the arbitration cycle completion interval which is not required to service the host channel.

In this aspect of the invention, a further step is provided which implements an idle state which is entered during the arbitration cycle completion interval in the event that there are no pending requests for access to the buffer memory from any channel.

In another aspect of the present invention, arbitration apparatus is provided within a buffer memory controller for arbitrating requests for access to a single buffer memory embedded within a disk drive presented by a plurality of channels including at least a disk data channel, a host interface data channel, and a microprocessor channel. The arbitration apparatus includes a circuit for arranging the disk data channel, the host interface data channel, and the microprocessor channel into a round-robin circular priority queue such that the disk data channel is assigned a highest priority for buffer access within the queue. The apparatus also includes a circuit for conducting an arbitration cycle by progressively servicing access requests pending within the queue, beginning with providing buffer access to the disk data channel. The apparatus further includes a resettable timer for establishing an arbitration cycle completion interval beginning upon completion of buffer access to the disk data channel. The apparatus further includes a buffer memory access control circuit for progressively providing access to the host interface data channel, and the microprocessor channel during the arbitration completion interval. The buffer memory access control circuit returns buffer access to the disk data channel in response to elapsed time of the resettable timer and an access request from the disk data channel, for returning access to the disk data channel prior to expiration of the arbitration cycle completion interval.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS
In the Drawings:
FIG. 1 is a simplified, overall electrical block diagram of a miniature hard disk drive architecture incorporating principles of the present invention.

FIG. 2 is an enlarged, linearized view of a portion of one concentric data track defined on a data storage surface of the rotating storage disk shown in the FIG. 1 diagram.

FIG. 3 is a view of a single user data block stored within a data field portion of the FIG. 2 data track.

DETAILED DESCRIPTION OF A PREFERRED EMBODIMENT

Figure 4:
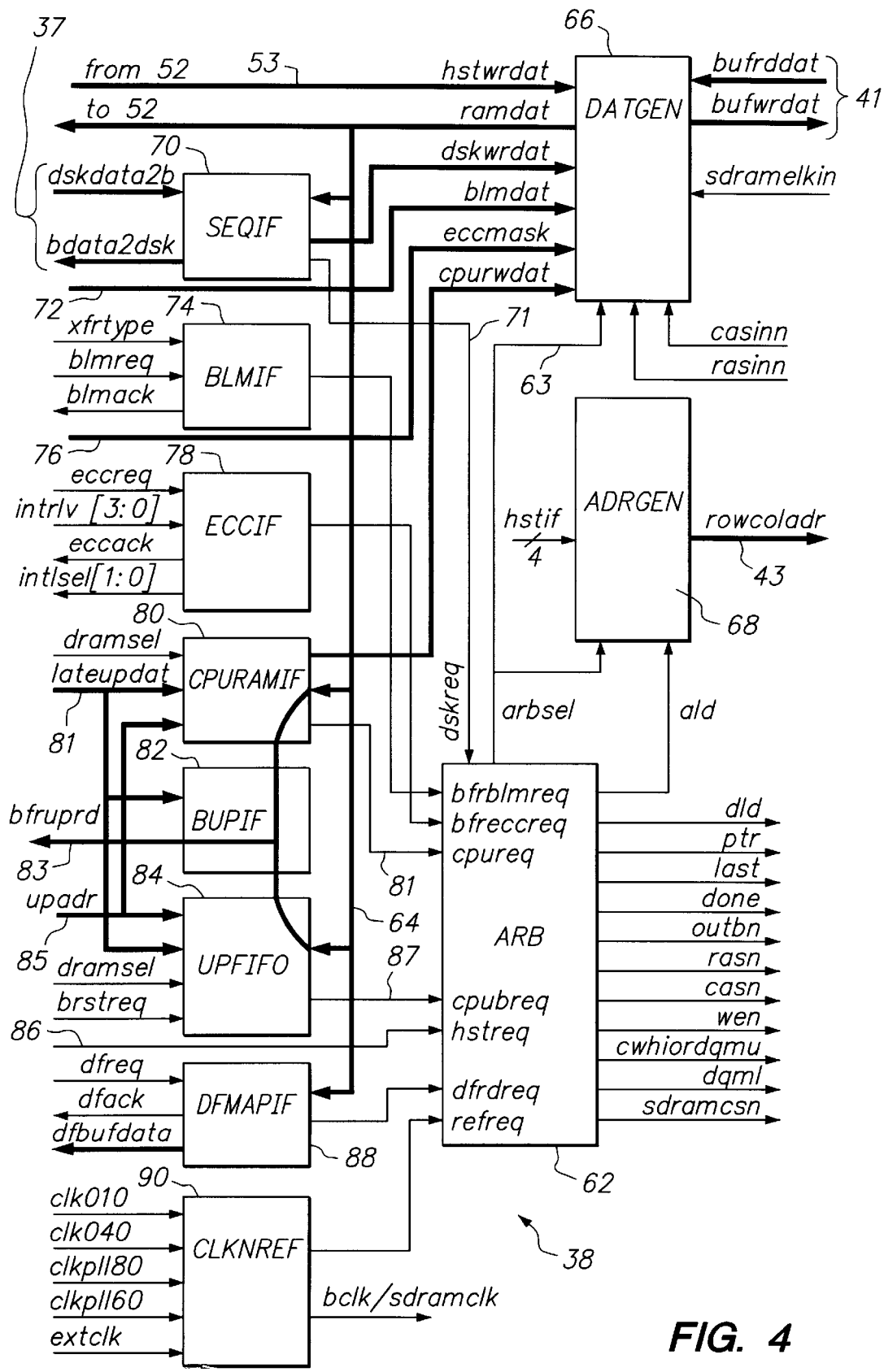
FIG. 4 is a more detailed electrical block diagram of the buffer manager of the FIG. 1 disk drive architecture.

FIG. 1 sets forth a simplified block diagram of portions of a disk drive architecture which are pertinent to an understanding and appreciation of the present invention. An exemplary disk drive 10 includes a rotating data storage disk 12, and a spindle motor 14 for rotating the disk 12 at a predetermined rotational velocity. In the case of a Winchester or "flying head" disk drive, the velocity must be sufficient to sustain flying characteristics of a slider carrying a data transducer head 16; typically the rotational velocity will be in a range between 5000 RPM and 10000 RPM. An electromechanical actuator structure 18 is mechanically linked to the data transducer head 16 and functions to position the head 16 at each selected one of e.g. a multiplicity of concentric data tracks defined on the e.g. thin film magnetic recording surface of the data storage disk 12. The rotating disk 12, spindle motor 14, transducer 16 and actuator 18 are conventionally included within an enclosed, contaminant-free housing known as a "head and disk assembly" in the hard disk drive art.

The actuator structure 18 is controlled by a head positioner servo process 20 which includes an embedded control microprocessor 22 of the drive. A spindle motor controller 24 provides controlled driving currents to the polyphase DC brushless spindle motor 14, and operates under supervision of the control microprocessor 22.

The data transducer head 16 is electrically coupled to a preamplifier/head selector/write driver circuit 30 which frequently also is included in the head and disk assembly in order to be close to the head 16 and thereby minimize pickup of extraneous electrical noise, etc. The circuit 30 is electrically connected to a disk read/write channel 32 which performs the task of converting digital information into analog information, and vice versa. In the present example, the disk channel 32 includes a formatter 34 and a disk FIFO 36. An embedded error correction code (ECC) process 35 works in conjunction with the formatter to generate and append ECC remainder bytes during data writes to disk, and to generate ECC syndrome bytes during data read operations. In the event of an error, the ECC process locates and corrects errors in user data within the buffer, and therefore can be a buffer memory client contending for access.

The disk FIFO 36 is connected as a priority client to a buffer manager 38 which operates in accordance with principles of the present invention. A buffer memory array 40 is controlled by the buffer manager 38 and provides user data block storage, microprocessor instruction and data storage, and storage for other clients within the disk drive 10. A host interface structure 60, such as a SCSI controller, or fast ATA controller, enables interconnection of the hard disk drive to a host computing environment in accordance with an established interface protocol. Other interfaces and protocols may be used.

A timer circuit 60 generates timing control sequences in synchronism with rotation of the disk 12, and supplies the timing sequences to the buffer manager 38. Other clients 62 within disk drive 10, such as buffer list manager, and defect map manager, not shown in FIG. 1, also contend for buffer access with the disk channel 32, host interface channel 50, and microprocessor 22.

As mentioned above, data is recorded magnetically as a pattern of magnetic flux transitions within concentric data tracks defined on a storage surface of the disk 12. The patterns include encoded user data, and certain overhead information needed for disk drive operation. In the FIG. 2 example of a data track, each data track of the drive 10 includes a series of spaced apart embedded servo regions or sectors S. There may be as many as 90 or more servo sectors embedded within each data track. Each servo sector S includes information used by the head position servo process 20 for precisely positioning the head 16 at the particular track during track following operations, and for enabling precision seeking from a departure track to a destination track during track seeking operations. The servo patterns and information are conventional and well understood by those skilled in the art and are not described any further herein.

An important point of FIG. 2 is that it illustrates that each servo sector interval provides a "servo time" during which user data cannot be transferred to or from the disk, and this time is available to the buffer manager 38 for allocation to other buffer memory clients in accordance with the arbitration principles of the present invention. Carrying this point a step further, FIG. 3 illustrates that within each data block DB, certain overhead information is also present which is not stored in the buffer array 40. This information includes a sync field and an address mark field at a header portion of the data block, and an error correction code field (ECC) at the end of the data block. The user data block may be fully contained within the data space between servo sectors as shown in FIG. 2, or it may be divided into segments and span one or more servo sectors. In this latter example each segment would include a header portion to enable resynchronization to the user data following interruption by the servo sector. The time intervals during which the head 16 is passing over the header portion (header time or ht) and over the ECC portion (ECC time or ECCt) provide additional time for allocation to other clients by the buffer manager in accordance with the arbitration principles of the present invention.

The disk data channel has an absolute requirement for buffer access. If buffer access does not keep up with the disk, user data is lost. If excess buffer access is provided to the dish data channel, no increase in performance is noted by the host or ultimate user beyond the interface. That user is simply unaware of the excessive buffer bandwidth being attributed to the disk data channel. The host interface channel can be throttled, so there is no absolute requirement for buffer memory access. However, host interface channel access to the buffer memory is a performance parameter most visible to the ultimate user who otherwise has to wait for delivery of requested data. Accordingly, the buffer allocation algorithm should maximize host interface channel bandwidth.

The microprocessor channel wants to minimize the time from a request for buffer access to actual service by the buffer controller. While the microprocessor channel is requesting buffer access, the microprocessor is idle. There must be an absolute maximum time for providing buffer access to the microprocessor, as the timing between a servo interrupt request and microprocessor buffer access must include this time. If this time becomes longer, the servo interrupt has to be sooner, and the processor is idle that much longer every servo interrupt interval. Accordingly, the frequency of checking the microprocessor for buffer access requests should be maximized.

Other miscellaneous channels also contend for buffer memory access, and these service requests must be handled in an orderly fashion such that memory access bandwidth is maximized without compromise of critical processes such as that of the disk data channel.

The buffer manager block 38 is preferably implemented in accordance with the more detailed functional block diagram of FIG. 4. Therein, an arbitration block 62 actually performs buffer access arbitration in accordance with principles of the present invention. The arbitration block 62 receives various client status values and access requests, and generates a series of control signals which are applied via a control bus structure to the buffer memory array 40. These signals are shown as lines with arrowheads leading out of the right hand side of the arbitration block 62. The arbitration block also generates arbitration selection control values and puts them out over a path 63 to a data generator (multiplexer) 66 and to an address generator 68. The data generator 66 receives incoming data from the host channel via paths 53, and from other channels including the disk channel via a disk interface 70, a buffer list manager channel (BLM) via a data path 72, an ECC mask channel via a path 76, and a microprocessor data channel via a microprocessor RAM interface 80. Data flowing out of the buffer memory 40 passes through the data generator 66 to a RAM data bus 64 which leads to the host interface FIFO 52, the disk channel FIFO 36 via interface 70, the ECC channel via interface 78, the microprocessor channel via interface 82, and the defect map channel via an interface 88. The disk channel interface 70, the buffer list manager channel interface 74, the ECC channel interface 78, the microprocessor RAM interface 80, the microprocessor FIFO channel interface 84, the host interface channel 50, and the defect map channel interface 88 generate and present buffer memory access requests to the arbitration block via control paths shown in FIG. 4 leading into the left and top sides of the arbitration block 62. A clock circuit 90 provides a reference clock to the arbitration circuit 62 which internally implements the timer 60 shown in FIG. 1.

Figure 5:
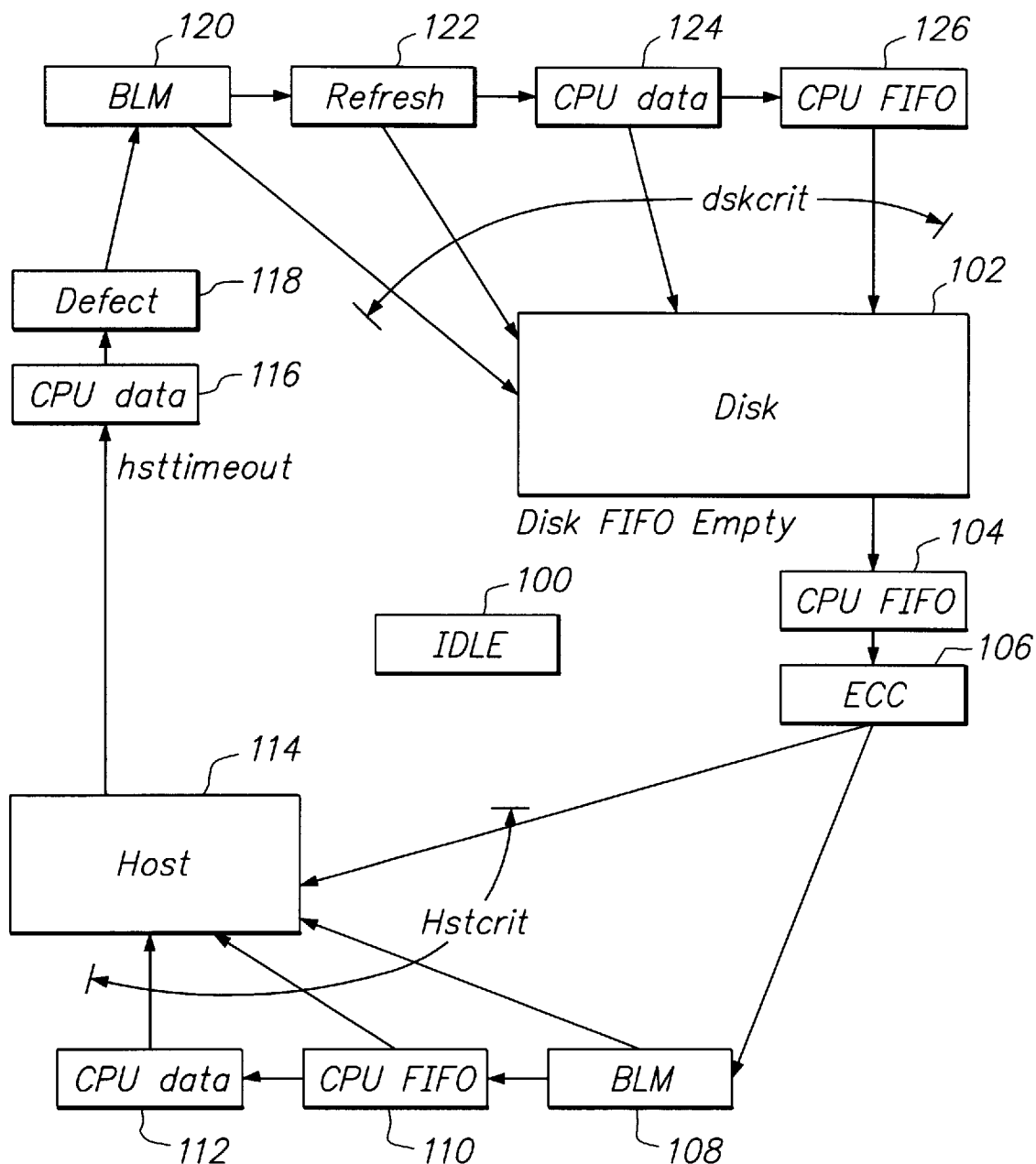
FIG. 5 is a state diagram of a memory controller state machine within the buffer memory access arbitration circuit shown in FIG. 4 buffer manager block.

As illustrated in the FIG. 5 state flow diagram, the presently preferred buffer access management algorithm employs a round-robin (circular priority) approach in which each client (channel) sequentially gains highest priority for buffer memory access. The time around the arbitration loop is set either by the disk data channel requirement, or the microprocessor channel requirement, whichever happens to be more stringent. There are no idle cycles at the DRAM array if any client is requesting buffer access. Otherwise, an idle state 100 may be reached from any access state and left in accordance with access requests and the circular priority established by the FIG. 5 approach.

Arbitration begins at a disk data channel access state 102. In accordance with the preferred approach there is no reason not to wait for the disk channel FIFO 36 to become entirely empty. Once FIFO 36 becomes entirely emptied of user data, the timer 60 is loaded with a value equal to the number of data words (time) it takes to fully load the FIFO 36. This interval depends upon the disk data channel data rate, and the storage capacity of the disk channel FIFO 36. The timer 60 is decremented each time a data word is clocked across the disk data channel into the channel FIFO 36. The timer count is monitored and used to control an absolute hard return of buffer memory access to the disk data channel access state 102. At time-out buffer access to the data channel must have returned in order to off load into the buffer 40 the user data from disk which has accumulated in disk channel FIFO 36 during the timed interval. However, once the disk channel FIFO 36 is emptied, and the timer reset, usage of the time interval available for servicing other clients is optimized. The elapsed time within the time interval, and the data rate, may be computed based upon the count then presently held in the timer 60.

After emptying the disk channel FIFO 36 and reloading and restarting the timer 60, the arbitration routine progresses through approximately half of the miscellaneous channels, including a first microprocessor FIFO channel (instruction) access state 104, and an ECC channel access state 106, and if sufficient time is available, a buffer list manager access state 108, a second microprocessor FIFO access state 110, and a microprocessor data access state 112 before arriving at a host interface channel access state 114.

It should be understood that the arbitrator state machine 62 proceeds directly from the ECC access state 106 to the host interface access state 114. Upon arrival at the host interface access state 114, the elapsed time as monitored by the timer 60 is checked. The fullness of the host interface channel FIFO 52 is also checked to see if any extra time is available before having to return to the disk data channel. If extra time is available, the BLM channel and the microprocessor channel are given extra buffer memory cycles as at states 108, 110, and 112 in order e.g. to avoid having to service BLM later on and in order to reduce microprocessor idle time and increase its process throughput and overall performance. If no extra time is available, the host critical condition exists. Accordingly, the host interface channel is serviced at state 114 and states 108, 110 and 112 are not reached. The host critical time is indicated by the arced arrow labeled Hstcrit in FIG. 5.

The host channel will retain access to the buffer memory at access state 114 until its FIFO 52 is emptied or an elapsed time is reached as will be needed to service the other half of the miscellaneous channels and still arrive at the disk data channel before the timer expires. Of course, if the host interface FIFO 52 becomes empty, the host channel gives up buffer memory access and progresses to the next access state or to the idle state 100 if no buffer access requests are pending. The buffer manager can determine how full the disk FIFO is, and take extra time if it is less full than expected by the count reached by the decrementing counter 60.

Following completion or termination of the host interface channel access state 114, the other half of the miscellaneous channels are provided with buffer access service, and the disk data channel is then reached in a timely fashion. These states include a microprocessor data channel access state 116, and a defect management channel access state 118. If at the time the arbiter state machine reaches the disk data channel state 102 the timer has not expired (labeled "dskcrit" in FIG. 5), some extra channels can be provided with buffer access. These additional miscellaneous channels include a second BLM channel access state 120, a memory refresh channel state 122, another microprocessor data channel access state 124, and another microprocessor FIFO channel state 126. It should be noted that the memory refresh channel needs be serviced infrequently, but at a regular interval. In the disk drive 10 a servo sector S will pass by the head 16 every e.g. 150 microseconds or so, depending upon the number of servo sectors per track and the disk rotational velocity. Since the buffer memory requires one refresh on average every 15.625 microseconds, several refresh cycles are clocked out during the servo interval. Therefore, at critical times, when the data channel FIFO 36 is filling, the refresh channel does not require any buffer memory bandwidth. The microprocessor data and FIFO channels can also be serviced if they present access requests and there is still time available (not dskcrit) before the mandatory return to the disk channel.

The priority for each channel (client) drops from highest to lowest after the particular channel has been given buffer access, and the channel moves up on the priority list maintained by the arbiter 62 as each channel above it on the priority list is serviced by buffer memory access. If all channel access requests are presented simultaneously while the arbiter is in the idle state 100, buffer access is given to the disk data channel as the highest priority client. Under most operating conditions the disk channel can hold onto buffer access for so long as it is requesting access. During a data write when the disk channel buffer FIFO 36 is being filled, disk channel buffer access may be terminated after the FIFO 36 has reached a predetermined fill state, such as two-thirds full and is not presently emptying data onto disk. After the disk access state 102, buffer channel access is passed on to the microprocessor data access state 104 (providing the disk channel did not experience a page break during buffer access) If a page break occurs, a new page address will have to be presented to the memory array, and an addressing delay may be incurred. Refresh requests are serviced in groups when the disk channel is not busy.

Each client access state triggers a sub-state machine implemented within the arbiter block 62 that generates the required DRAM control signals. For EDO DRAM these signals include RASN, CASN, WEN and CASORWENHI. For synchronous DRAM, two additional signals are generated including DQML and SDRAMCSN. Each sub-state machine also generates the channel control signals such as address load (ALD), data load (DLD) and request clear enable (PTR). The request clear enable control (PTR) is based upon memory pointers and means that the issuing state machine has already learned of the data request and is sent as early as possible to the client requesting memory access. The data load control (DLD) means that the memory array has the requested data and that it is now available on e.g. bus 64. Synchronous DRAM also requires a specific set of operations to be executed on power-up of the disk drive 10. These operations are directed by a power-up state machine also resident within the arbiter 62. The power-up state machine executes two Sync DRAM commands: precharge all banks (PALL) and mode register set (MRS).

The actual calculations to implement this example of the method of the present invention use "CAStime". One CAStime is the time for accessing one data word in page mode (one column address strobe (CAS) cycle). This is a convenient unit of measure since the number of words in disk channel FIFO 36 and host FIFO 52 are used in the timing equations implementing the present example of the invention. The timer 60 counts in the same units as the CAS cycles: three clocks for fast page DRAM, two clocks for EDO RAM, and one clock for synchronous DRAM. A host critical time "HSTCRITTIME" indicates that there is not sufficient time to service any miscellaneous channels before the host channel is serviced. This time is set by the microprocessor 22 in accordance with:

hstcrit=castime<hstcrittime+#words in host FIFO 52

The time to cut off host channel buffer memory access (hsttimeouttime) is set by the microprocessor 22 in accordance with:

hsttimeout=castime<hsttimeouttime+words in disk FIFO 36

The time to return to the disk channel (dskcrit) is set by the microprocessor 22 in accordance with:

dskcrit=castime<words in disk FIFO 36.

It should be noted that if the disk channel is not requesting access to the buffer memory, but the disk channel is reached as the highest priority channel for access in the round-robin, the CAS timer 60 will be reloaded and reset.

Another feature found necessary for implementation within the arbitration process is a FIFO fill timer. This timer is required to handle a unique situation arising during data writes from buffer to disk. User data must be transferred to disk immediately following the sync and address mark fields of the data header region. Accordingly, the beginning of the data block must be present in the data channel FIFO at the end of the data header region. This time may be short and require faster access by the data channel to the buffer memory than otherwise. Therefore, upon receipt of a disk channel FIFO fill command, the count of the CAS timer 60 is compared with a maximum FIFO fill time calculated by the microprocessor 22. If the timer count is greater, it is reset to the maximum fill time.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A buffer memory control including access arbitration apparatus for arbitrating access to a single buffer memory array embedded within a disk drive among requests presented by a plurality of disk drive channels including at least a disk data channel, a host interface data channel, a microprocessor channel, and a plurality of other miscellaneous data channels seeking buffer access, the access arbitration apparatus comprising:

means for arranging the disk data channel, the host interface data channel, the microprocessor channel and the plurality of other miscellaneous data channels into a round-robin circular priority queue such that the disk data channel is assigned a highest priority for buffer access within the queue, means for conducting an arbitration cycle by progressively servicing buffer access requests pending within the queue, beginning with providing buffer access to the disk data channel, resettable timer means for establishing an arbitration cycle completion interval beginning upon completion of buffer access to the disk data channel, buffer memory access control means for progressively providing access to the host interface data channel, the microprocessor channel and at least one of the plurality of other miscellaneous data channels during the arbitration completion interval, the buffer memory access control means responsive to elapsed time of the resettable timer means and access request from the disk data channel, for returning access to the disk data channel prior to expiration of the arbitration cycle completion interval.

2. A method for arbitrating requests for access to a single buffer memory embedded within a disk drive presented by a disk data channel, a host interface channel, a microprocessor channel and a plurality of other miscellaneous data channels seeking buffer access, the method comprising the steps of:

arranging the disk data channel, the host interface data channel, the microprocessor channel and the plurality of other miscellaneous data channels into a round-robin circular buffer access priority queue, assigning the disk data channel to a highest priority level for buffer access within the priority queue, conducting an arbitration cycle by progressively servicing buffer access requests pending within the priority queue, beginning with providing buffer access to the disk data channel, establishing an arbitration cycle completion interval beginning upon completion of buffer access to the disk data channel, progressively providing access to the host interface data channel, the microprocessor channel and at least one of the plurality of other miscellaneous data channels during the arbitration completion interval, returning access to the disk data channel prior to expiration of the arbitration cycle completion interval if the disk data channel is then requesting buffer memory access, and repeating the foregoing steps in a subsequent arbitration cycle wherein another one of the plurality of other miscellaneous data channels is provided buffer memory access in accordance with the round-robin circular priority queue.

3. The method set forth in claim 2 wherein the step of establishing the arbitration cycle completion interval includes determining a data fill level of a first-in, first-out buffer within the disk data channel.

4. The method set forth in claim 2 wherein the plurality of other miscellaneous data channels includes at least one of error correction code channel, buffer list manager channel, disk defect management channel, and dynamic memory refresh channel.

5. The method set forth in claim 2 comprising a further step of determining a host critical time interval based upon determination of a data fill level of a first-in, first-out buffer within the host interface channel.

6. The method set forth in claim 5 wherein the at least one of the plurality of other miscellaneous data channels is provided access to the buffer memory following determination that the host critical time interval provides extra buffer memory access time within a present arbitration cycle completion interval which is not required to service the host channel.

7. The method set forth in claim 2 including a further step of entering an idle state during the arbitration cycle completion interval in the event that there are no pending requests for access to the buffer memory from any channel.

8. A method for arbitrating requests for access to a single buffer memory embedded within a disk drive presented by a plurality of channels including at least a disk data channel, a host interface data channel, a microprocessor channel, and a plurality of other miscellaneous data channels seeking buffer access, the method comprising the steps of:

arranging the disk data channel, the host interface data channel, the microprocessor channel, and the plurality of other miscellaneous data channels into a round-robin circular priority queue, assigning the disk data channel a highest priority for buffer access within the queue, conducting an arbitration cycle by progressively servicing buffer access requests pending within the queue, beginning with providing buffer access to the disk data channel, establishing an arbitration cycle completion interval beginning upon completion of buffer access to the disk data channel, progressively providing access to the host interface data channel, the microprocessor channel and at least one of the plurality of other miscellaneous data channels during the arbitration completion interval, returning access to the disk data channel prior to expiration of the arbitration cycle completion interval if the disk data channel is then requesting buffer memory access, and repeating the foregoing steps in a subsequent arbitration cycle in accordance with the round-robin circular priority queue.

9. The method set forth in claim 8 wherein the plurality of other miscellaneous data channels include at least one of error correction code channel, buffer list manager channel, disk defect management channel, and dynamic memory refresh channel.

10. The method set forth in claim 8 comprising a further step of determining a host critical time interval based upon determination of a data fill level of a FIFO within the host interface channel and wherein the at least one of the plurality of other miscellaneous data channels is provided access to the buffer memory following determination that the host critical time interval provides extra buffer memory access time within the arbitration cycle completion interval which is not required to service the host channel.

11. A method for arbitrating requests for access to a single buffer memory embedded within a disk drive presented by a plurality of channels including at least a disk data channel, a host interface data channel, and a microprocessor channel, the method comprising the steps of:

arranging the disk data channel, the host interface data channel, and the microprocessor channel into a round-robin circular priority queue, assigning the disk data channel a highest priority for buffer access within the queue, conducting an arbitration cycle by progressively servicing access requests pending within the queue, beginning with providing buffer access to the disk data channel, establishing the arbitration cycle completion interval beginning upon completion of buffer access to the disk data channel, including determining a data fill level of a FIFO within the disk data channel, progressively providing access to the host interface data channel, and the microprocessor channel during the arbitration completion interval, returning access to the disk data channel prior to expiration of the arbitration cycle completion interval if the disk data channel is then requesting buffer memory access, and repeating the foregoing steps in a subsequent arbitration cycle in accordance with the round-robin circular priority queue.

12. A method for arbitrating requests for access to a single buffer memory embedded within a disk drive presented by a plurality of channels including at least a disk data channel, a host interface data channel, and a microprocessor channel, the method comprising the steps of:

arranging the disk data channel, the host interface data channel, and the microprocessor channel into a round-robin circular priority queue, assigning the disk data channel a highest priority for buffer access within the queue, conducting an arbitration cycle by progressively servicing access requests pending within the queue, beginning with providing buffer access to the disk data channel, determining a host critical time interval based upon determination of a data fill level of a FIFO within the host interface channel;

establishing an arbitration cycle completion interval beginning upon completion of buffer access to the disk data channel, progressively providing access to the host interface data channel, and the microprocessor channel during the arbitration completion interval, returning access to the disk data channel prior to expiration of the arbitration cycle completion interval if the disk data channel is then requesting buffer memory access, and repeating the foregoing steps in a subsequent arbitration cycle in accordance with the round-robin circular priority queue.

13. A method for arbitrating requests for access to a single buffer memory embedded within a disk drive presented by a plurality of channels including at least a disk data channel, a host interface data channel, and a microprocessor channel, the method comprising the steps of:

arranging the disk data channel, the host interface data channel, and the microprocessor channel into a round-robin circular priority queue, assigning the disk data channel a highest priority for buffer access within the queue, conducting an arbitration cycle by progressively servicing access requests pending within the queue, beginning with providing buffer access to the disk data channel, establishing an arbitration cycle completion interval beginning upon completion of buffer access to the disk data channel, progressively providing access to the host interface data channel, and the microprocessor channel during the arbitration completion interval, providing an idle state which is entered during the arbitration cycle completion interval in the event that there are no pending requests for access to the buffer memory from any channel, returning access to the disk data channel prior to expiration of the arbitration cycle completion interval if the disk data channel is then requesting buffer memory access, and repeating the foregoing steps in a subsequent arbitration cycle in accordance with the round-robin circular priority queue.

\* \* \* \* \*